July 21, 1931. G. B. CROUSE 1,815,141
VOLTAGE REGULATOR
Filed Dec. 14, 1926

Inventor:
George B. Crouse

Patented July 21, 1931

1,815,141

UNITED STATES PATENT OFFICE

GEORGE B. CROUSE, OF WOODCLIFF, NEW JERSEY, ASSIGNOR TO CONNER CROUSE CORPORATION, OF NEW YORK, N. Y., A CORPORATION OF NEW YORK

VOLTAGE REGULATOR

Application filed December 14, 1926. Serial No. 154,790.

This invention relates to voltage regulators, and more specifically to voltage regulators for compensating for temperature caused changes of resistance in the transmission circuit elements of an electrical system.

In an electrical system comprising a source of energy, a load and intermediate transmitting or converting elements such as transformers, rectifiers and/or filters, the current passing through these elements will cause their temperature, and thus their resistance, to rise. Unless the elements are made uneconomically large, this increase of resistance will cause a troublesome drop of potential at the output of the system.

An object of this invention is to provide apparatus for compensating for the effect of temperature caused variations of the output voltage of an electrical system. A further object is to provide apparatus for the purpose stated which shall be economical of first cost and electrical energy. More specifically, an object is to provide apparatus for filtering alternating current components from a direct current supply and in which variations in the temperature of the filter elements will not effect a variation of the load voltage.

Figure 1:
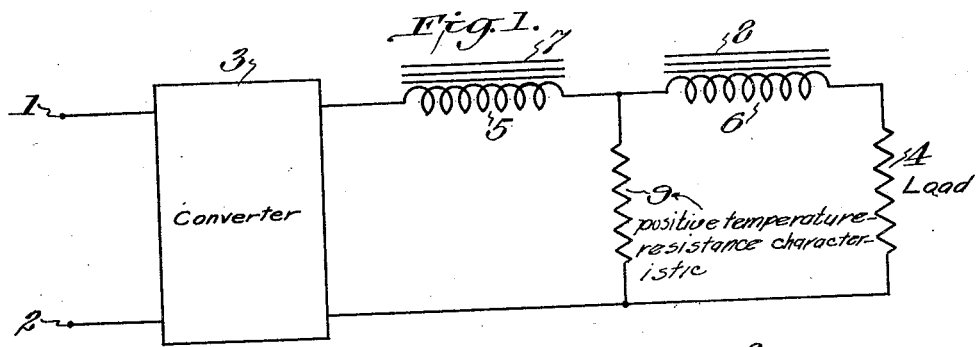
Figure 2:
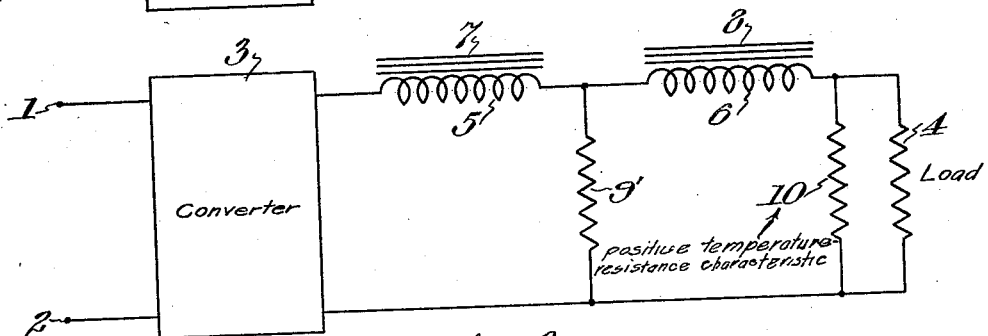
Figure 3:
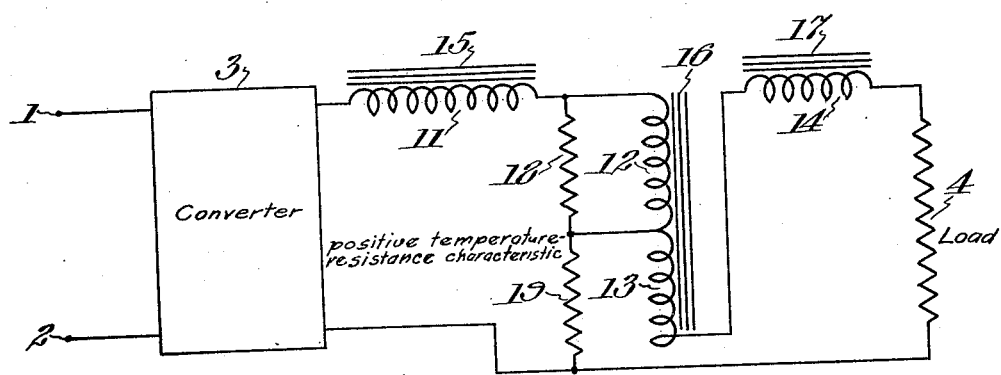

These and other objects of the invention will be apparent from the following specification, when taken with the accompanying drawings, in which Figs. 1, 2 and 3 are diagrams of electrical converter and filter circuits in which the invention is embodied.

Referring to the drawings, Figs. 1 and 2 are diagrams showing the application of the invention to electrical converters and filters.

In Fig. 1, the terminals of an alternating current supply are shown at 1 and 2, feeding energy to a converter 3. The direct current output of the converter is passed to a load 4 through a filter comprising the series coils 5 and 6 on the iron cores 7 and 8, and the shunt resistance 9. This system is a well known combination and requires no special explanation. The alternating current supplied by the source is changed to pulsating unidirectional current by the converter 3, and the pulsations of the converter are removed by the filter, so that substantially smooth direct current is delivered to the load.

Assuming that the system has been out of operation for such time that the parts are all at the temperature of the ambient air, the placing of the system into operation is followed by a gradual increase in the temperature of the parts. The rise of temperature of those windings which are in effective series relation between the source and the load will cause a corresponding diminution of the voltage across the load, due to the temperature-resistance coefficient of the windings.

To prevent this drop of load voltage, the shunt element 9 is formed of material having a high or positive temperature coefficient, and is so proportioned in thermal and electrical characteristics, in relation to the other elements of the system, that, as the temperature of the system rises, the amount of the current by-passed through 9 diminishes. In this manner, the total current, i. e. the load current plus the current through 9, will diminish so that the potential drop across those elements in series relation between the source and the cross resistance 9 will be diminished by the amount that the drop across the series elements between the resistance 9 and the load has increased, so that the voltage across the load remains substantially constant.

The same regulation of the load voltage may be effected without modifying the construction or operation of the filter system. The converter, load and filter elements of the circuit of Fig. 2 may be substantially identical with the respective elements of Fig. 1 which are identified by the corresponding numerals 1 to 8, inclusive. In place, however, of the temperature-variant resistance 9 of Fig. 1, the shunt element 9' of the filter may be of the usual construction, i. e. of substantially constant value. The circuit includes the temperature-variant resistance 10 which is connected directly across the load 4. In this circuit the resistance 10 should be so proportioned that the product of the total current flowing through the elements in effective series relation between the source and the load times the resistance of those elements, will remain substantially constant.

In Fig. 3, the invention is shown applied to the filter system shown in my co-pending application No. 130,252, filed August 19, 1926. In this circuit, as before, the terminals 1, 2 of an alternating current supply deliver energy through the converter 3 to the direct current load 4. Inductances 11, 12, 13 and 14, wound on iron cores 15, 16, 17 and 18, respectively, are arranged as series elements in one of the load lines. A resistance 18 is shunted across the inductance 12, and a second resistance 19 is connected across the inductances 13, 14 and the load 4. The operation of this arrangement as a filter is fully described in the application above mentioned.

The resistance 19 is formed of material having such temperature-variant properties that it may function in the same manner as the resistance 9 of the filter shown in Fig. 1.

It will be apparent that for the compensation to be effective at all times, the temperature-time characteristic of the controlling resistance 9, 10 or 19, must be the same as that of the series elements. The actual design of the resistance to secure this result can only be determined by experiment. It may be pointed out however that only three factors affect the design; first, the normal energy dissipated in the control resistance; second, its thermal capacity, i. e. specific heat times mass; and third, its thermal insulation. The amount of energy converted into heat in the resistance will normally be fixed by other considerations, and therefore it will only be necessary to vary the size of the unit and character or thickness of its covering material.

When very exact compensation is desired, the controlling resistance may be arranged to be in thermal contact with any or all of the series elements of the system.

It will be apparent that the invention is not limited to the specific circuits shown in the accompanying drawings, but is useful in electrical circuits in which temperature-variant transmitting elements are located between a source of energy and the load.

It is therefore to be understood that the various elements, their relative size and arrangement, are subject to wide variation without departure from the spirit of my invention as set forth in the following claims.

I claim:

1. In an electrical system, the combination with a source of energy, a load, and a series transmission element therebetween having a positive temperature coefficient, of a resistance across said load having a positive temperature coefficient, said resistance being arranged in heat-transfer relation with said series element and so proportioned that its temperature-produced variation of resistance substantially neutralizes the effect upon the load voltage of the current-produced change of resistance of said element.

2. An electrical filter comprising a plurality of series inductances and a resistance shunted across the line between said inductances, said resistance having a positive temperature coefficient and a temperature-time characteristic such that current-produced changes in the temperature of the elements of said filter render the output voltage of the filter substantially independent of the temperature of the elements.

In testimony whereof, I affix my signature.

GEORGE B. CROUSE.